(12) United States Patent
Nagata et al.

(10) Patent No.: US 6,412,365 B1
(45) Date of Patent: Jul. 2, 2002

(54) LEATHER-WRAPPED STEERING WHEEL AND METHOD FOR MANUFACTURING THE SAME

(75) Inventors: Atsushi Nagata, Inazawa; Mikine Hayashi, Gifu; Shinsuke Shimiya, Nagareyama, all of (JP)

(73) Assignees: Toyoda Gosei Co., Ltd., Aichi-ken; Nissin Chemical Corporation, Kawaguchi, both of (JP)

( * ) Notice: Subject to any disclaimer, the term of this patent is extended or adjusted under 35 U.S.C. 154(b) by 9 days.

(21) Appl. No.: 09/638,855

(22) Filed: Aug. 15, 2000

(30) Foreign Application Priority Data

Aug. 19, 1999 (JP) ............................................ 11-232303

(51) Int. Cl.$^7$ ................................................ B62D 1/06
(52) U.S. Cl. ........................................................ 74/558
(58) Field of Search ...................... 74/552, 558, 558.5; 16/436, 444, 446; 112/141; 38/102.91, 140

(56) References Cited

U.S. PATENT DOCUMENTS

| 4,179,950 | A | * | 12/1979 | Valley | 74/558 |
| 4,581,954 | A | * | 4/1986 | Uchida | 74/552 |
| 4,782,872 | A | * | 11/1988 | Moschini | 74/558 |
| 5,251,506 | A | * | 10/1993 | Itagaki | 74/558 |
| 6,065,366 | A | * | 3/2000 | Koyama et al. | 74/552 |
| 6,216,556 | B1 | * | 4/2001 | Koyama et al. | 74/52 |

FOREIGN PATENT DOCUMENTS

| JP | 3-82680 | * | 3/1991 | B62D/7/14 |
| JP | 3-279075 | * | 3/1991 | B62D/1/06 |
| JP | 4-159174 | * | 4/1992 | B62D/1/04 |
| JP | 6-64546 | * | 6/1994 | B62D/1/06 |
| JP | 10-226338 | | 8/1998 | |

* cited by examiner

*Primary Examiner*—David Fenstermacher
*Assistant Examiner*—Timothy McAnulty
(74) *Attorney, Agent, or Firm*—Pillsbury Winthrop LLP

(57) ABSTRACT

The leather-wrapped steering wheel of the present invention is provided with a ring portion which is gripped at the time of steering. The ring portion includes a core, a covering layer which covers the core and leather which covers the covering layer. The covering layer includes an annular groove in the circumferential direction of the cross section of the ring portion. The leather is constituted such that binding strings are disposed at the distal edges of the leather in the surface circumferencial direction of the ring portion, and the distal edges are fitted into the annular grooves so as to cover the covering layer. The distal edges of the leather are disposed in the annular grooves together with the binding strings and are fitted into the annular grooves by pulling and tying both ends of the binding strings to each other.

5 Claims, 12 Drawing Sheets

Fig. 5A
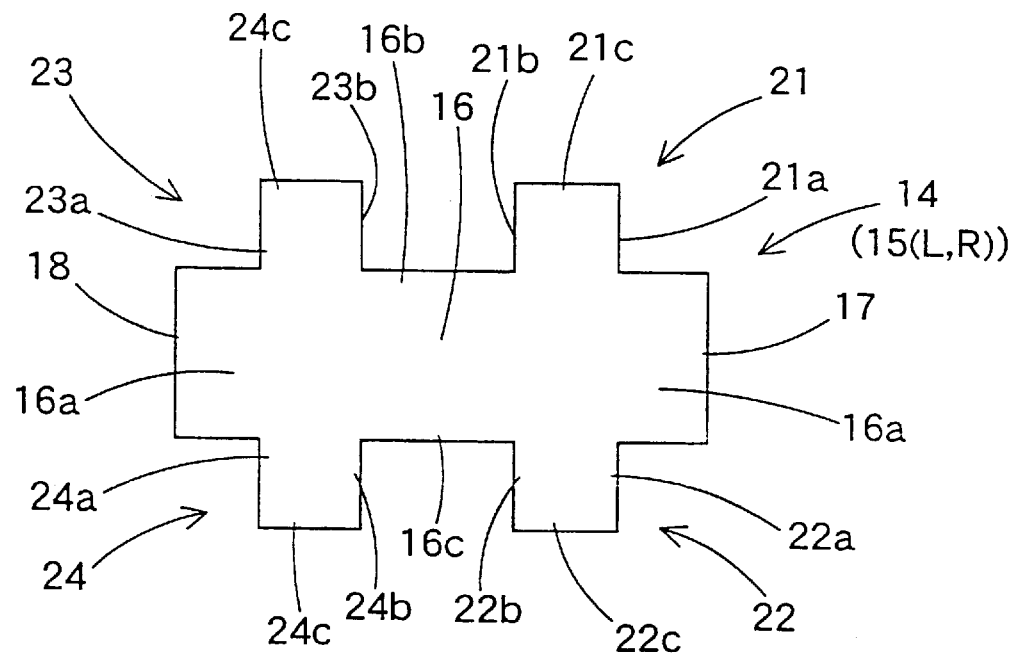
Fig. 5B
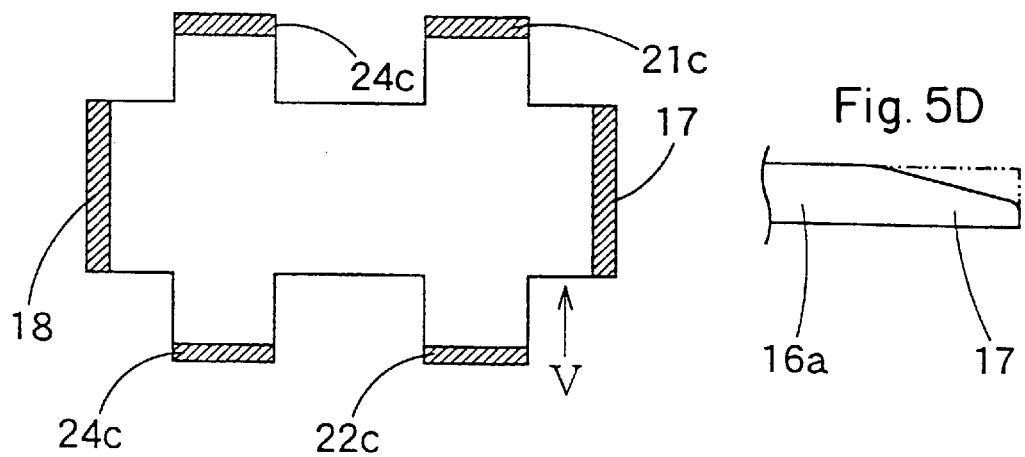
Fig. 5D
Fig. 5C
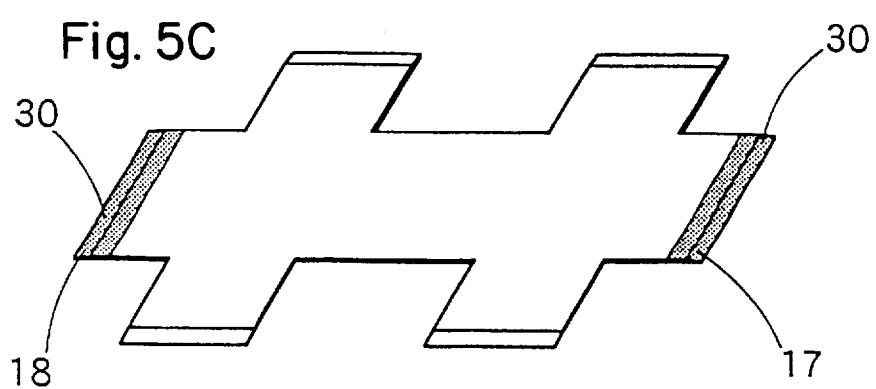

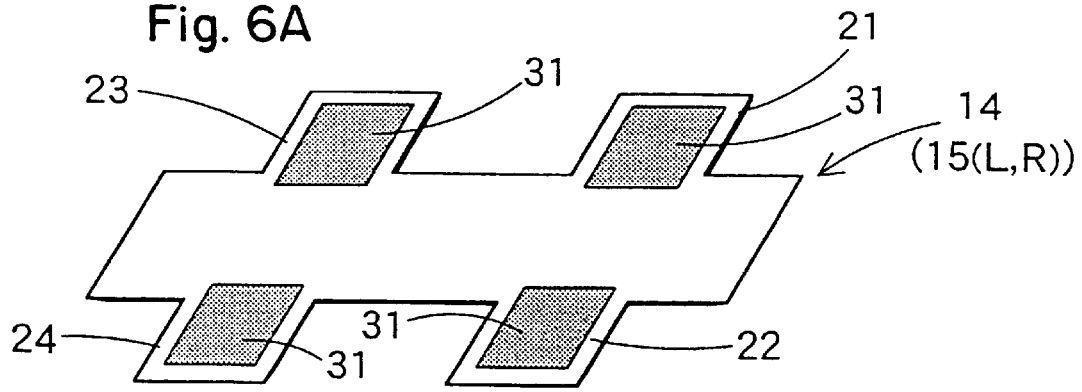
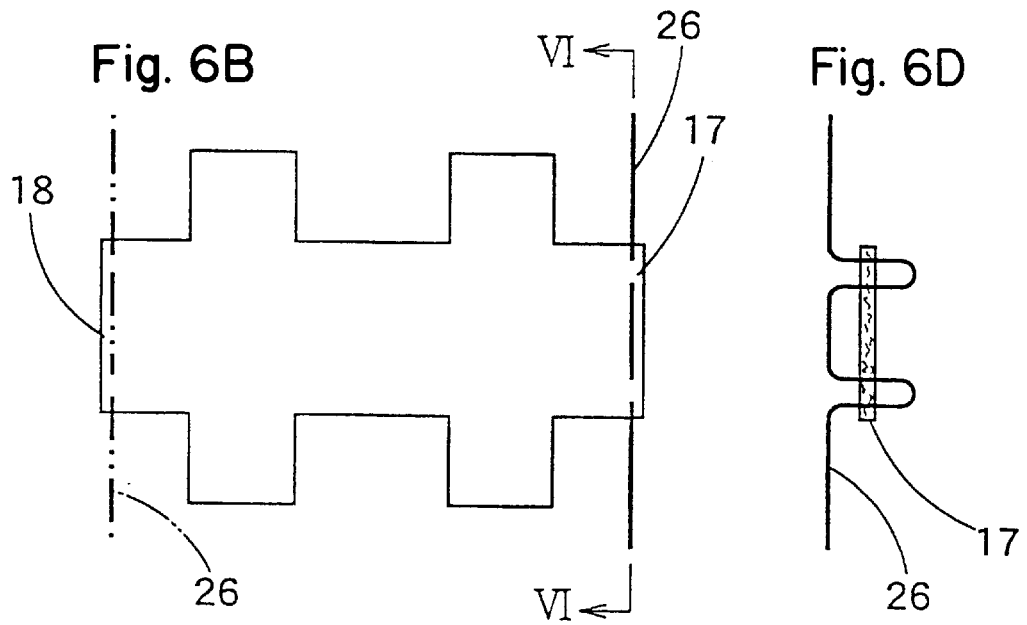
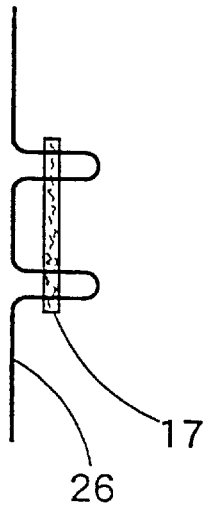
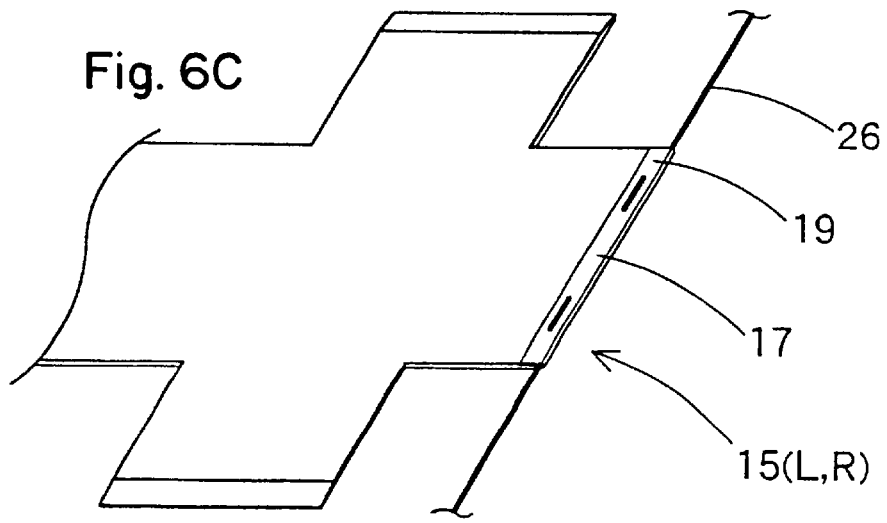

LEATHER-WRAPPED STEERING WHEEL AND METHOD FOR MANUFACTURING THE SAME

BACKGROUND OF THE INVENTION

1. Field of the Invention

The present invention relates to a leather-wrapped steering wheel for steering a vehicle and to a manufacturing method. The leather-wrapped steering wheel of the present invention is provided with a ring portion. The ring portion is provided with a covering layer, with the leather covering that covering layer.

2. Description of Related Art

Conventionally, in a leather-wrapped steering wheel, where a ring portion covering layer is covered with leather, the leather extends along the surface circumferential direction of the ring portion, and has distal edges. The covering layer is provided with annular grooves formed in the circumferential direction on the cross-section of the ring portion. Further, the distal edges of the leather are fitted into the annular grooves of the covering layer (see Japanese Laid-open Patent Publication 226338/1998).

In such a leather-wrapped steering wheel, to enhance the outer appearance of the leather, the peripheries of the annular grooves are formed of hard material such as hard synthetic resin or the like. That is, by forming the peripheries of the annular grooves with hard material, the distal edges of the leather can be acutely bent around the rims of such annular grooves and then fitted into the annular grooves. Further, parts of the leather in the vicinity of the annular grooves which protrude from the annular grooves are formed in an apparent sharp edge shape thus enhancing the outer appearance of the leather.

However, in case of forming the peripheries of the annular grooves with hard material such as hard synthetic resin or the like, it is necessary to properly set the length of the leather. This is because if the length of the leather is too long, when the distal edges of the leather are fitted into the annular grooves, the leather gives rise to an extra portion and wrinkles appear at the peripheries of the annular grooves. On the other hand, if the length of the leather is short, even when the distal edges of the leather are fitted into the annular grooves, the distal edges of the leather can come out from the annular grooves.

Further, in case an adhesive agent is used to prevent the distal edges of the leather from coming out of the annular grooves, the peripheries of the annular grooves become sticky with the adhesive agent.

Still further, where a spatula is used to fit the distal edges of the leather into the annular grooves, the use of the spatula however may injure the distal edges of the leather.

SUMMARY OF THE INVENTION

It is an object of the present invention to provide a leather-wrapped steering wheel and a method for manufacturing the same where the distal edges of the leather easily fit into annular grooves while keeping the distal edges of the leather and the peripheries of the annular grooves neat and clean. That is, it is an object of the present invention to provide a leather-wrapped steering wheel and a method for manufacturing the same which can carry out the leather wrapping operation neatly and simply.

The object of the present invention can be achieved by the leather-wrapped steering wheel which has a following constitution.

The leather-wrapped steering wheel of the present invention is provided with a ring portion which is gripped at the time of steering. The ring portion includes a core, a covering layer which covers the core and the leather wrap which covers the covering layer. The covering layer is provided with annular grooves in the circumferential direction along the cross section thereof. The leather is constituted such that binding strings are provided to distal edges of the leather along the surface circumferential direction of the ring portion and the distal edges are fitted into the annular grooves so as to make the leather cover the covering layer. The binding strings are disposed at the distal edges of the leather such that the binding strings are restricted from moving in the direction along the surface circumferential direction of the ring portion and are made to pass through the distal edges of the leather such that the binding strings are movable along the annular grooves. The distal edges of the leather are disposed in the annular grooves together with the binding strings and then both ends of the binding strings are pulled and tied together so as to make the distal edges fitted into the annular grooves.

In the leather-wrapped steering wheel of the present invention, by merely pulling and tying the binding strings in the inside of the annular grooves after disposing the distal edges of leather in the annular grooves together with the binding strings, the distal edges of the leather can be fitted into the annular grooves.

Here, the movement of the binding strings along the surface circumferential direction of the ring portion is restricted while the binding strings are made to pass through the distal edges of the leather such that the binding strings are movable along the annular grooves. Accordingly, even when the binding strings are pulled, the binding strings are not slipped off from the distal edges of the leather along the plane circumferential direction of the ring portion. Thereafter, by tying the binding strings, the distal edges of the leather are shrunk along the annular grooves so that the distal edges can be fitted into the annular grooves.

Further, by tying the binding strings, the distal edges of the leather can make portions thereof through which the bindings strings are made to pass assuredly disposed on the bottom surfaces of the annular grooves. Accordingly, the distal edges of the leather can be properly positioned and then are fitted into the annular grooves.

Further, the distal edges of the leather can be fitted into the annular groove by simply tying the binding strings without using the adhesive agent or the spatula so that the distal edges of the leather and the peripheries of the annular grooves are neither smeared nor injured.

Accordingly, with the leather-wrapped steering wheel of the present invention, the leather wrapping operation in the vicinity of the annular grooves can be carried out neatly and simply.

Loop portions may be formed on the distal edges of the leather and the binding strings may be made to pass through the inside of the loop portions.

Further, the binding strings may be stitched to the distal edges of the leather in the direction along the annular grooves. In this constitution, the loop portions need not be formed on the distal edges of the leather. Accordingly, compared to the case where the loop portions are formed, this constitution can reduce the processing man-hours and the processing cost for loop portions. Further, the leather may be provided with upper and lower extension portions. These upper and lower extension portions cover front and rear surfaces ranging from the covering layer of the ring portion to the covering layers of the spoke portions which extend from the covering layer of the ring portion and are disposed on front and rear surfaces of the covering layers of the spoke portions by stitching the peripheries thereof to each other. In this case, by making use of remaining portions of the binding strings which remain after tying portions of the binding strings in the annular grooves, the peripheries of the upper and lower extension portions can be stitched to each other. Accordingly, the distal edges of the binding strings can be effectively, thus eliminating the need to cut off of the distal edges of the binding strings.

Further, the object of the present invention can be achieved by the following method for manufacturing leather-wrapped steering wheels. In the method for manufacturing leather-wrapped steering wheels of the present invention, the leather-wrapped steering wheel is provided with a ring portion which is gripped at the time of steering. The ring portion is comprised of a core, a covering layer which covers the core and leather which covers the covering layer. The covering layer is provided with annular grooves which are formed in the circumferential direction of the cross section of the ring portion. The leather is constituted such that the leather has distal edges thereof along the surface circumferential direction of the ring portion fitted into the annular grooves so as to cover the covering layer. The leather is comprised of a body portion which covers the covering layer of the ring portion by stitching the peripheries to each other at the inner peripheral side of the ring portion and upper and lower extension portions which cover front and rear surfaces ranging from the covering layer of the ring portion to the covering layers of spoke portions which extend from the body portion of the ring portion by stitching peripheries to each other. Further, binding strings are made to pass through distal edges of the body portion of the leather such that the movement of the binding strings along the surface circumferential direction of the ring portion is restricted while the binding strings are movable along the annular grooves. Then, at the time of mounting the leather, the distal edges of the body portion of the leather are disposed in the annular grooves together with the binding strings. Then, by pulling both ends of the binding strings together and tying them, the distal edges of the body portion of the leather are fitted into the inside of the annular grooves. Further, by stitching the peripheries of the upper and lower extension portions each other by making use of the remaining portions of the binding strings after tying the binding strings at positions in the inside of the annular grooves, the leather-wrapped steering wheel can be manufactured.

According to the method for manufacturing leather-wrapped steering wheels of the present invention, by merely tying the binding strings in the inside of the annular grooves and pulling the binding strings, the distal edges of the body portion of the leather can be properly positioned and fitted into the inside of the annular groove without using either an adhesive agent or a spatula. Accordingly, the distal edges of the leather and the peripheries of the annular grooves are neither smeared nor injured. As a result, the distal edges of the body portion of the leather can be fitted into the annular grooves neatly. Further, by making use of the remaining portions of the binding strings which have portions thereof tied in the annular grooves, the peripheries of the upper and lower extension portions of the leather are stitched each to other thus manufacturing the leather-wrapped steering wheel. Accordingly, the binding strings are effectively utilized. Still further, after properly positioning the distal edges of the body portion of the leather and fitting them into the annular grooves, the upper and lower extension portions are stitched each other. Accordingly, the upper and lower extension portions can be also properly positioned and disposed. As a result, the outer appearance of the leather wrapped portions is enhanced.

At the time of stitching the peripheries of the upper and lower extension portions each other, first of all, using one end of each binding string, the peripheries of the upper and lower extension portions are stitched to each other in a staggered stitching pattern (zigzag chain stitching pattern). Then, the other end of each binding string is made to pass through the rear surface side of the zigzag chain stitched portion. Finally, the two ends of the two binding strings may be tied with each other at the stitching end position of the zigzag chain stitching.

In such a manufacturing method, the other end of the binding string is made to pass through the rear surface side of the stitched portion and is tied with one end of the binding string which binds the peripheries of the upper and lower extension portions to each other. Accordingly, the slipping off of the binding strings from the leather can be prevented so that the peeling off or the dislocation of the leather can be suppressed.

Incidentally, in the conventional staggered stitching (zigzag chain stitching), the end portions of the string are individually tied after performing the zigzag chain stitching thus only forming large knots respectively at the end portions. Accordingly, the knots are liable to be slipped off from the leather. However, in the above-mentioned manufacturing method, both end of the string are tied with each other such that the front and the rear of the leather wrap the ends of the strings and hence, the slipping off of the string from the leather can be prevented.

These objects and advantages of the present invention will become further apparent from the following detailed explanation.

BRIEF DESCRIPTION OF THE DRAWINGS

FIGS. 5A–5D are schematic views showing the sequential steps for manufacturing the leather used in the embodiment, with FIG. 5D showing a view as seen in the direction "V" in FIG. 5B.

FIGS. 6A–6D are schematic views showing the sequential steps for manufacturing the leather used in the embodiment which come after the steps shown in FIG. 5, with FIG. 6D being a cross-sectional view along line VI—VI in FIG. 6B.

DETAILED DESCRIPTION OF THE PREFERRED EMBODIMENTS

The present invention is explained hereinafter based on embodiments shown in drawings. The present invention, however, is not limited to the embodiments, but in fact also includes any variations within the requisites of claims or equivalents thereof should be understood as being included in the scope of the claims.

Figure 1:
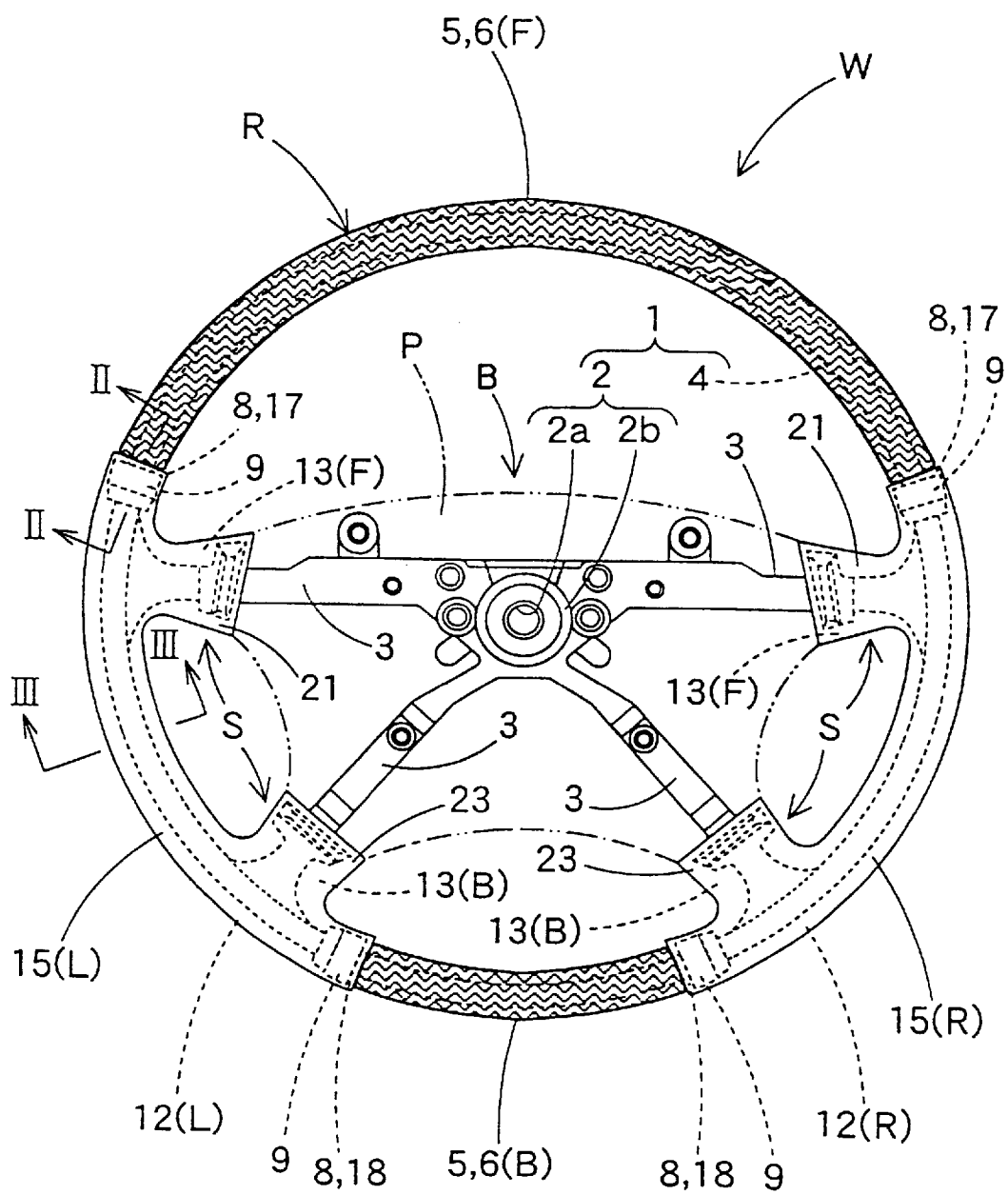
FIG. 1 is a plan view of leather-wrapped steering wheel of one embodiment of the present invention.
Figure 2:
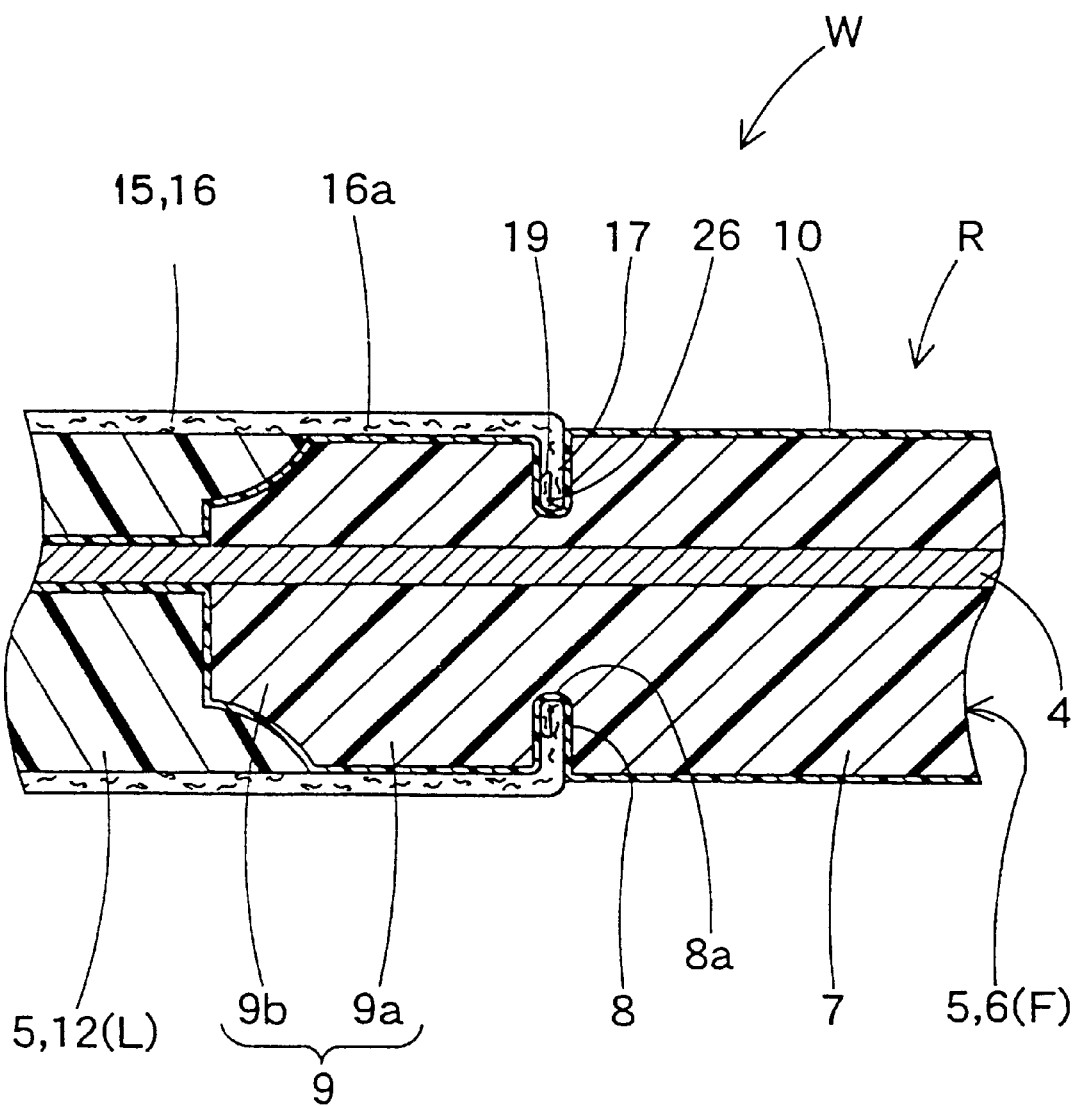
FIG. 2 is a cross-sectional view taken along a line II—II of FIG. 1.
Figure 3:
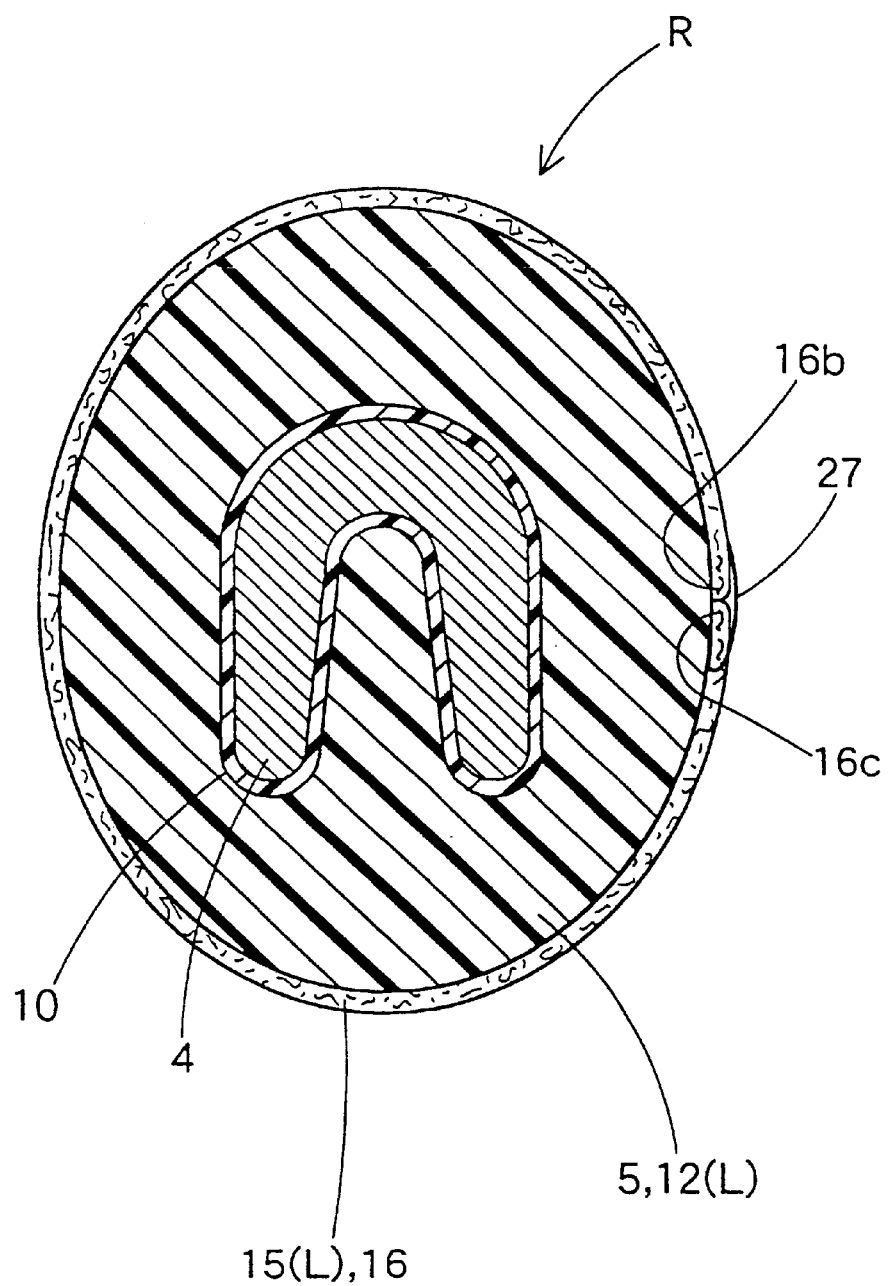
FIG. 3 is a cross-sectional view taken along a line III—III of FIG. 1.
Figure 4:
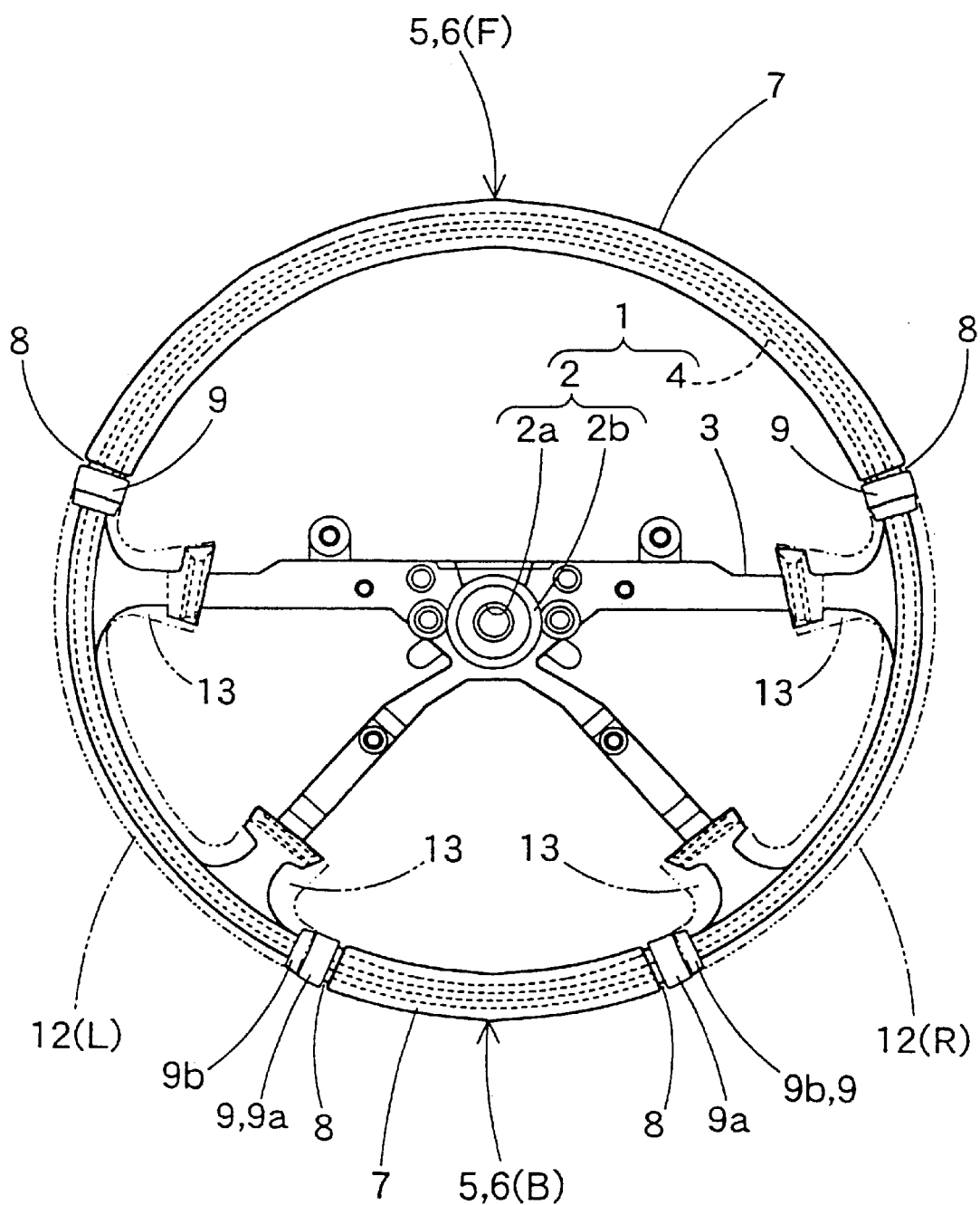
FIG. 4 is a plan view showing a steering wheel of the embodiment before being wrapped with the leather.

A leather-wrapped steering wheel W of the embodiment includes, as shown in FIG. 1 to FIG. 4, a ring R, a boss B and four spokes S. The ring R is the part which is gripped by a driver at the time of steering. The boss B is disposed at the center of the ring R. Each spoke S provides a connection between the ring R and the boss B. The steering wheel core 1 is metal and is part of the ring R, the boss S and four spokes S and they are interconnected. As shown in FIG. 1 and FIG. 4, the steering wheel core 1 includes a boss core 2 of the boss B, spoke cores 3 disposed in respective spokes S and a ring core 4 disposed in the ring R. The boss core 2 includes a central boss 2a and a boss covering 2b which surrounds the boss 2a. The boss 2a is connected to a steering shaft not shown in the drawing.

In the steering wheel cores 1, the boss 2a is made of steel and other cores, that is, the boss covering 2b of the boss core 2, the spoke core 3 and the ring core 4 are made of a light alloy such as magnesium alloy, aluminum alloy or the like. The boss covering 2b, the spoke core 3 and the ring core 4 are formed, for example, by die casting techniques.

As shown in FIG. 2 and FIG. 3, the cross-sectional shape of the ring core 4 has an inverse U-shape which opens toward the rear surface side (downward side) of the steering wheel W.

As shown in FIG. 1 to FIG. 4, a covering layer 5 covers the periphery of the ring core 4 and the spoke cores 3 in the vicinity of the ring R of the steering wheel W. The covering layer 5, which covers the periphery of the ring core 4, is constituted by hard covering layers 6 and soft covering layers 12. The hard covering layers 6 are made of hard synthetic resin. The soft covering layers 12 are made of soft synthetic resin. The covering layers 6, 12 are disposed in pairs and are arranged alternately along the surface circumferential direction of the ring R.

The soft covering layers 12 include spoke covering layers 13 (13F, 13B) which cover the peripheries of the spoke cores 3. The soft covering layers 12 are disposed at left and right sides of the steering wheel W. On the outer peripheries of the left and right soft covering layers, 12L, 12R, respectively, including the spoke covering layers 13, leather covers 15 are, respectively, wrapped. The leather covers 15 are wrapped with the use of binding strings 26, 27, which are threads made of polyamide, polyester or the like.

In the embodiment shown in FIGS. 1–4, the left and right soft covering layers 12L, 12R are made of foamed urethane, while the front and rear hard covering layers 6F, 6B are made of polypropylene. On the surface of the main body 7 of the hard covering layers 6F, 6B, thin decorative layers 10, having a woody pattern, are respectively mounted. The decorative layers 10 are formed by printing which uses water pressure transfer.

Further, in this embodiment, to decrease man-hours used in the manufacturing steps, the decorative layers 10 are extended over the peripheries of supports 9 (described later) and the ring core 4 of the hard covering layers 6F, 6B.

Further, as shown in FIG. 1, FIG. 2 and FIG. 4, the supports 9 are provided at the respective distal edges of the main bodies 7 of hard covering layers 6F, 6B in the surface circumferential direction of the ring R. Each support 9 supports an end portion 16a of the main body 16 (described later) of the leather cover 15. Further, each support 9 is provided with an annular groove 8 formed in a circular ring shape in the circumferential direction of the cross section of the ring R. Distal edges 17, 18 of the leather cover 15 are acutely bent and then are fitted into the annular grooves 8. That is, the annular grooves 8 are formed as grooves 8 in which are fitted the distal edges 17, 18 of the leather cover 15. Each support 9 has an approximately columnar shape and includes a support surface 9a and a tapered area 9b. The support surface 9a supports the edge 16a of the leather body portion 16. The tapered area 9b is disposed at the distal edge side of the support surface 9a and is tapered.

As shown in A of FIG. 5, the left and right leather covers 15L, 15R, respectively, include a rectangular body portion 16 and four extension portions 21, 22, 23, 24. The extension portions 21, 22, 23, 24 symmetrically protrude from both sides of the body portion 16. These extension portions are comprised of a pair made of an upper extension portion 21 and a lower extension portion 22 and another pair made of an upper extension portion 23 and a lower extension portion 24. The upper extension portion 21 and the lower extension portion 22 cover the front and rear surfaces (upper and lower surfaces) of the front-side spoke portion covering layer 13F. The upper extension portion 23 and the lower extension portion 24 cover the front and rear surfaces (upper and lower surfaces) of the rear-side spoke covering layer 13B. The body 16 of the leather covers 15L, 15R, respectively, cover the soft covering layers 12L, 12R of the ring R. Further, the body 16 covers the supports 9 of the hard covering layers 6F, 6B with both end portions 16a, 16b thereof.

Figure 10A:
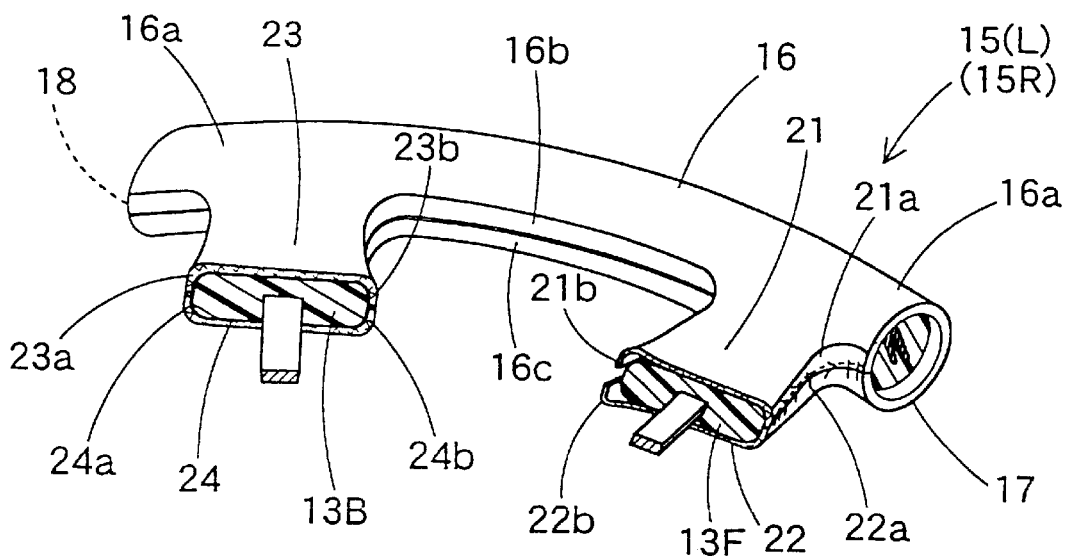
FIG. 10 is a schematic view showing steps for stitching upper and lower extension portions of the leather in the embodiment.

As shown in FIG. 6C and FIG. 2, the leather covers 15L, 15R are respectively provided with loop portions 19 at distal edges 17, 18 formed on both ends of the body portion 16. Binding strings 26 pass through the loop portions 19. The distal edges 17, 18 are fitted into annular grooves (fitting grooves) 8, 8 of the hard covering layers 6F, 6B after tying the binding strings 26. Further, peripheries 21a, 22a of the upper and lower extension portions 21, 22 at the distal edge side 17 are stitched to each other (see FIG. 10A and FIG. 10B). The stitching is performed by using the binding string 26 disposed at the distal edge 17. The upper and lower extension portions 21, 22 cover the front and rear surfaces of the front-side spoke covering layer 13F. Further, as shown in FIG. 10A, peripheries 23a, 24a of the upper and lower extension portions 23, 24 at the distal edge 18 are also stitched to each other. The stitching is performed by using the binding strings 26 at the distal edge 18. The upper and lower extension portions 23, 24 cover the front and rear surfaces of the rear-side spoke covering layer 13B. Further, as shown in FIG. 3, portions 16b, 16c, which are formed along the peripheries of the body portion 16 and are disposed between the extension portions 21, 22, 23, 24, are stitched to each other with a binding string 27 at the inner peripheral side of the ring R. This binding string 27 is also used for stitching peripheries 21b, 22b of the upper and lower extension portions 21, 22 disposed away from the distal edge 17, as well as peripheries 23b, 24b of the upper and lower extension portions 23, 24 disposed away from the distal edge 18, to each other.

The manner of manufacturing this leather cover 15 is explained hereinafter. First, as shown in FIG. 5A, a leather member 14 is cut out in a given shape and includes a body portion 16 and the extension portions 21, 22, 23, 24. Then, as shown in FIG. 5B, distal edges 17, 18, 21c, 22c, 23c, 24c of the body portion 16 and the extension portions 21, 22, 23, 24 are stretched thin such that they become thinner toward the distal edges thereof. They are thinned to enhance their wrapping property at the time of wrapping the leather. Further, as shown in FIG. 5C, to facilitate forming of the loops 19, an adhesive agent 30, such as urethane (one-liquid), may be coated on the distal edges 17, 18. Still further, as shown in FIG. 6A, to facilitate fitting of the distal edges 17, 18 into the fitting grooves 8, temporary adhesive tapes 31 are adhered to the extension portions 21, 22, 23, 24.

Then, as shown in FIG. 6B, the binding strings 26 are disposed at the distal edges 17, 18. Here, to prevent slippage, or displacement from the distal edges 17, 18, of the strings 26, as illustrated in the drawings, the binding string 26 is stitched at two or more places along the distal edges 17, 18. The orientation of the binding strings 26 is aligned with the widthwise direction of the distal edges 17, 18.

Subsequently, to activate the adhesive agent 30, portions of the leather cover 15 in the vicinity of the distal edges 17, 18 are heated. Thereafter, as shown in C of FIG. 6, the distal edges 17, 18 are folded back and are adhered to the leather 15. Then, the loops 19, through which the binding strings 26 are made to pass, are formed on the distal edges 17, 18. As a result, a leather cover 15 (L, R) which is ready for being wrapped to the ring portion R can be prepared.

In this embodiment, at the distal edges 17, 18 of the leather cover 15, the movement of the binding string 26 in the direction along the surface circumferential direction of the ring R is restricted by the provision of the loop 19. On the other hand, the binding string 26 is made to pass through the loop 19 such that the binding string 26 is movable along the fitting groove 8. Since the binding string 26 is thin, even when the adhesive agent 30 is adhered to the binding string 26, the adhesive agent 30 can be easily peeled off. As a result, the binding string 26 can be easily moved along the fitting groove 8.

Subsequently, the method for manufacturing leather-wrapped steering wheels W of this embodiment is explained hereinafter. Preliminarily, the steering wheel core 1 is manufactured. The steering wheel core 1 is produced by die casting which uses a given die casting mold. The boss 2a is preliminarily set in the die casting mold.

Then, the steering wheel core 1 is set in forming molds for the hard covering layers 6F, 6B and the hard covering layers 6F, 6B provided with the fitting grooves 8 and the support portions 9 are integrally molded by these forming molds.

Thereafter, the forming molds are opened and the molded product is removed from the molds. Subsequently, flash on the molded product is removed. Then, the boss core metal portion 2 of the steering wheel core 1 is masked. The decorative layer 10 is formed on selected portions, including, for example, the main body 7 portion between the fitting grooves 8, 8 of respective hard covering layers 6F, 6B other than the boss core 2, again, for example, by using water pressure transfer.

Subsequently, the previously applied mask member is removed. The steering wheel core 1 provided with the hard covering layers 6F, 6B is set in forming molds for the soft covering layers 12L, 12R. Thereafter, the molds are fastened and a forming material for the soft covering layers 12L, 12R is filled in the molds so as to form the soft covering layers 12L, 12R. The mold surface of the forming mold for the soft covering layers 12L, 12R is set to the condition that the molding surface is capable of coming into pressure contact with the outer peripheral surface of the support surface portion 9a of the support portion 9 of the hard covering layer 6 at the time of fastening the molds.

Thereafter, the molded product, including the soft covering layers 12L, 12R, is removed from the forming molds and a flash removing operation is carried out. Then, the leather covers 15 (L, R) are mounted on the peripheries of respective soft covering layers 12L, 12R by stitching.

Figure 7A:
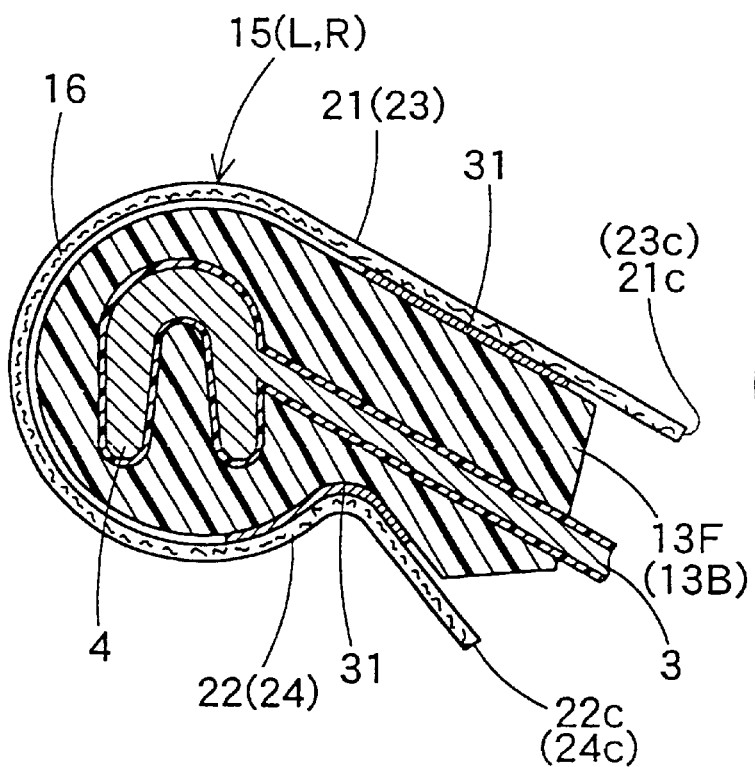
FIG. 7 is a schematic view showing sequential steps for wrapping the leather in the embodiment.
Figure 7C:
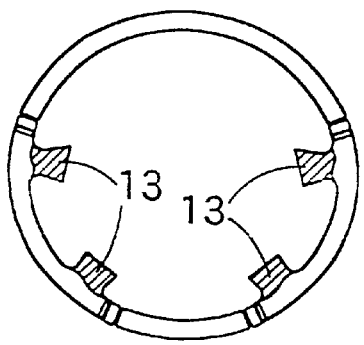
Figure 7B:
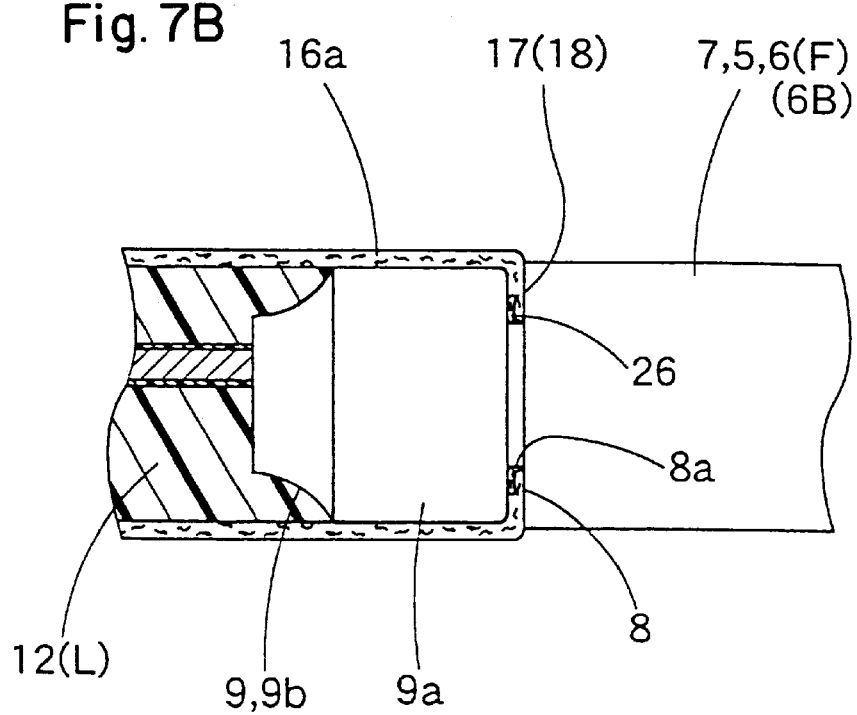

At the time of wrapping (stitching) the leather 15, the distal edges 17, 18 of the leather cover 15 are disposed in the vicinity of the fitting grooves 8. Here, since the binding strings 26 are made to pass through the distal edges 17, 18 of the leather cover 15, the binding strings 26 are also made to be disposed in the vicinity of the fitting grooves 8. Further, as shown in A of FIG. 7, using the adhesive tape 31, the upper and lower extension portions 21, 23, 22, 24 are temporarily fastened to the spoke portion covering layer 13. Then, as shown in FIG. 7B, the binding strings 26 are pulled and tied.

Figure 9A:
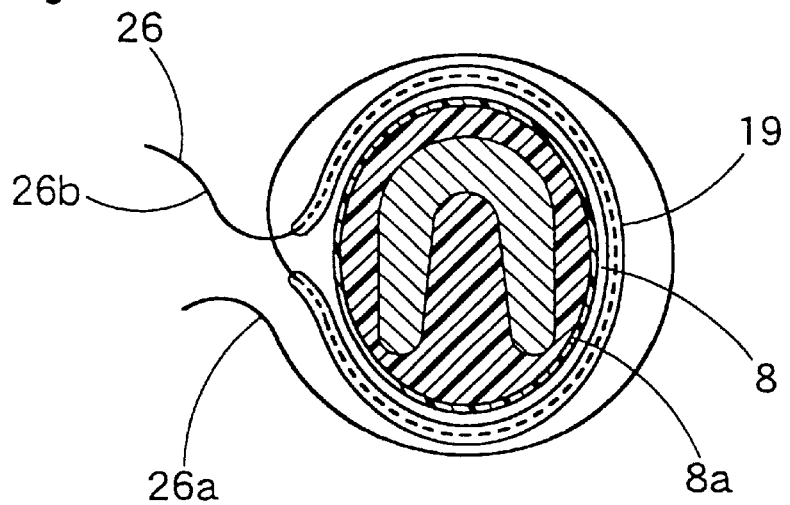
FIG. 9 is a schematic view showing sequential steps for tying the binding strings at the time of fitting the distal edges of the leather into annular grooves in the embodiment.
Figure 9B:
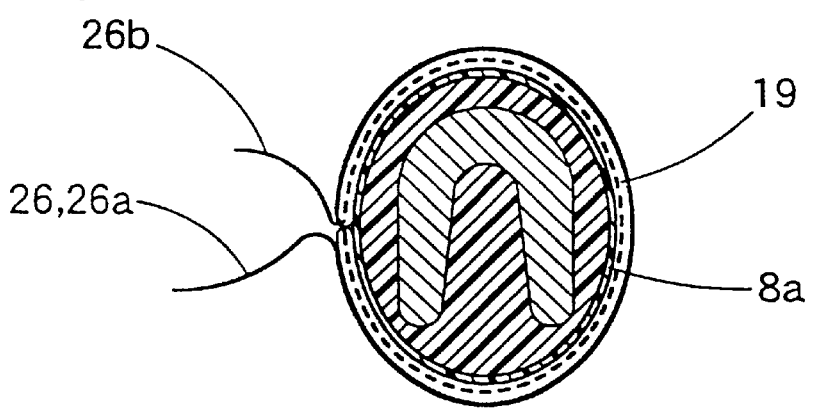
Figure 9C:
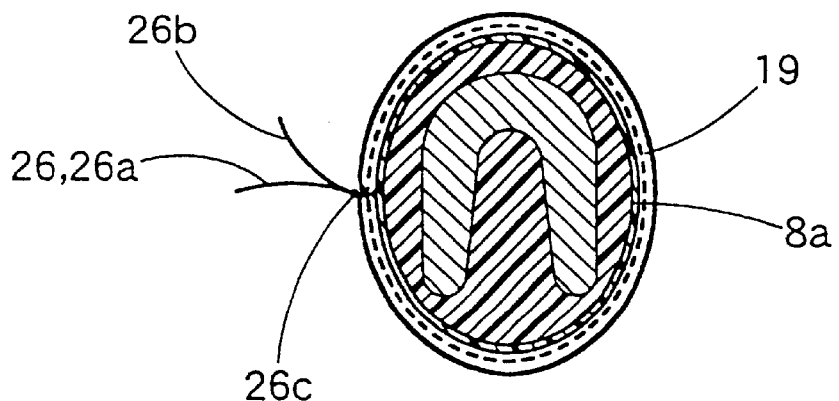

As shown in FIG. 9A, one end 26a of the binding string 26 is wound once around the fitting groove 8. Then, as shown in FIG. 9B, both ends 26a, 26b are strongly pulled to tighten the binding string 26. As shown in FIG. 9C, both ends 26a, 26b are tied each other in a given tying method such as a square knot. The knot 26c is disposed at the inner peripheral side of the ring portion R so as to facilitate the stitching operation of the extension portions 21, 22, 23, 24 which follows the binding operation.

Here, the movement of the binding string 26 in the surface circumferential direction of the ring R is restricted and the binding strings 26 pass through the distal edges 17, 18 of the leather cover 15 such that the binding strings 26 are movable along the fitting grooves 8. Accordingly, even when the binding strings 26 are pulled, the binding strings 26 are not removed from the distal edges 17, 18 of the leather cover 15 along the surface circumferential direction of the ring R. Then, by pulling the binding strings 26, the distal edges 17, 18 of the leather cover 15 are shrunk along the fitting grooves 8 and fitted into the fitting grooves 8. Further, by tying the binding strings 26, the distal edges 17, 18 of the leather cover 15, through which the binding strings 26 are made to pass, are assuredly disposed at the bottom surface 8a of the fitting grooves 8. Accordingly, the distal edges 17, 18 of the leather cover 15 are properly positioned and fitted into the fitting grooves 8.

Figure 8A:
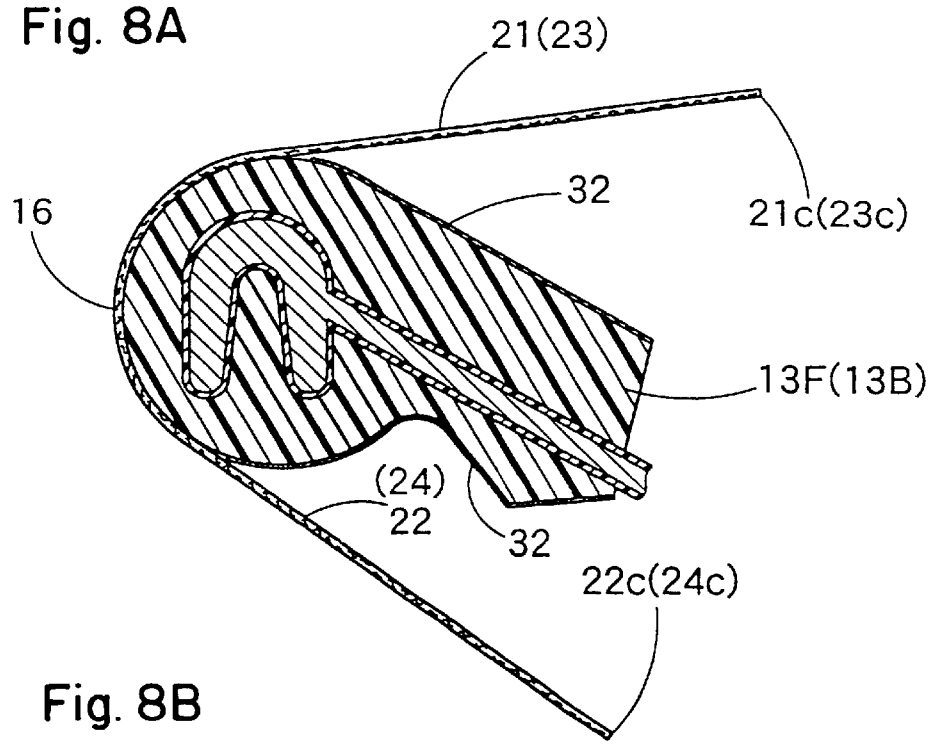
FIG. 8 is a schematic view showing sequential steps for wrapping the leather in the embodiment which come after the steps shown in FIG. 7.
Figure 8B:
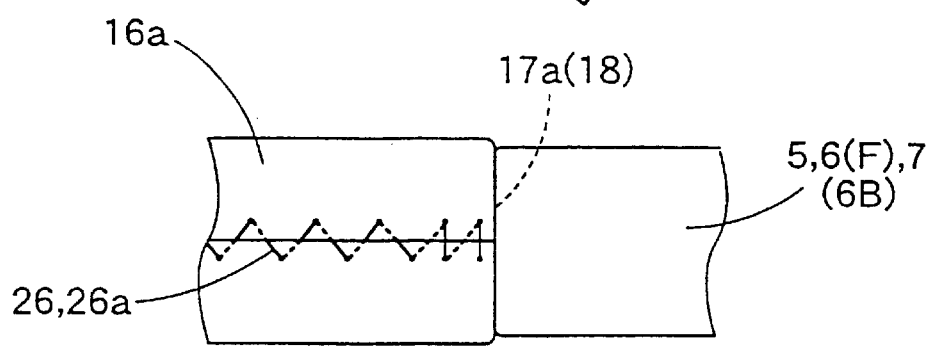

After fitting the distal edges 17, 18 of the leather cover 15 into the fitting grooves 8, the upper and lower extension portions 21, 22, 23, 24 are peeled off from the spoke covering layers 13 and thereafter, as shown in FIG. 8A, an adhesive agent 32 is coated on the front and rear surfaces of the spoke covering layers 13. Then, the upper and lower extension portions 21, 22, 23, 24 are pressed to the spoke covering layers 13. Further, as shown in FIG. 8B, by making use of the binding strings 26, both of the main body edges 16a are stitched to each other. By making use of the binding strings 26, the edges 21a, 22a of the upper and lower extension portions 21, 22 at the distal edge 17 are stitched to each other.

Figure 10B:
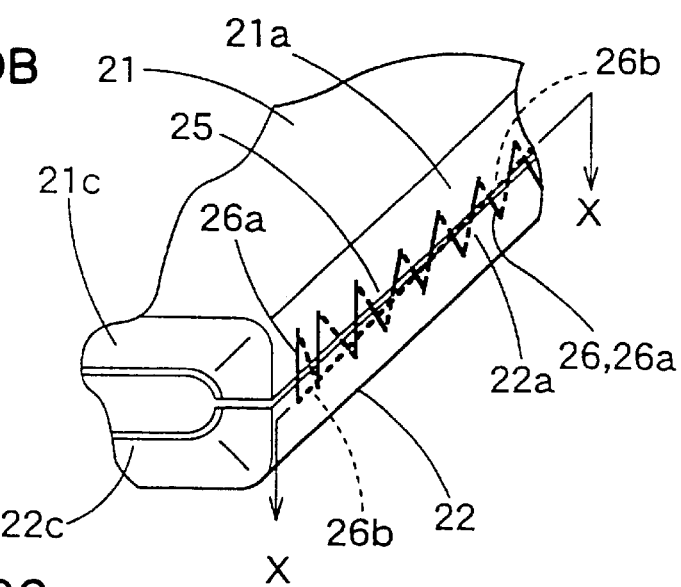
Figure 10C:
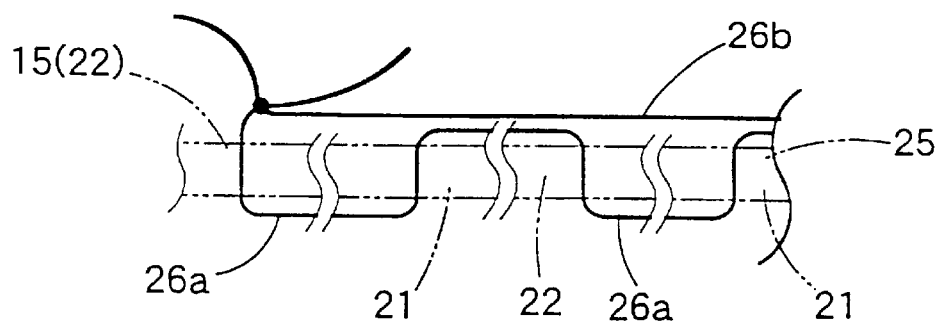

As shown in FIG. 8B and FIGS. 10A and 10B, by making use of one end 26a of the binding strings 26, the peripheries 21a, 22a are stitched each other in a staggered stitching pattern (a zigzag chain stitching pattern). Further, the other ends 26b of the binding strings 26 pass through the back side of the stitched portions 25. Then, as shown in FIG. 10C, one end 26a and the other end 26b of the binding string 26 are tied to each other by a given tying method, such as a square knot, at the portion of the binding string 26 where the zigzag chain stitching (staggered stitching) ends at the rear surface side of the leather cover 15.

Although not shown in FIG. 10A, also at the leather distal edge 18, by using the binding string 26, both edges of the body portion 16a are stitched to each other and the edges 23a, 24a of the upper and lower extension portions 23, 24 are stitched to each other.

Further, by using the binding string 27, the edges 21b, 22b of the upper and lower extension portions 21, 22 are stitched to each other, the peripheries 16b, 16c of the body portion 16 are stitched to each other, and the edges 23b, 24b of the upper and lower extension portions 23, 24 are stitched to each other.

Before stitching with these binding strings 26, 27, an adhesive agent may be coated on the surfaces of the soft covering layers 12L, 12R and the support portions 9 of the ring portion R and then the leather covers 15 may be stitched. The adhesive agent is coated such that the agent is not pushed out from the fitting grooves 8 to the main body 7 side of the hard covering layers 6F, 6B.

Figure 8C:
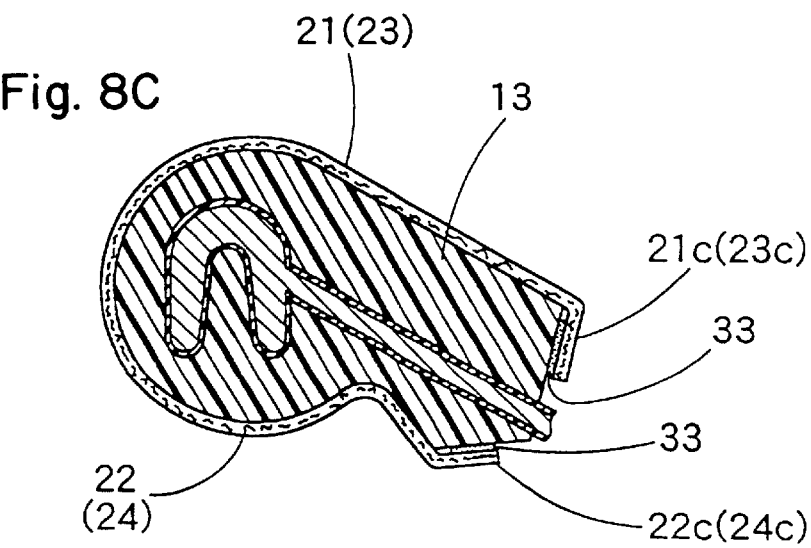

Thereafter, as shown in FIG. 8C, an adhesive agent 33 is coated on the surfaces of the spoke covering layer 13 edge portions. Then, by adhering the distal edges 21c, 22c, 23c, 24c of the upper and lower extension portions 21, 22, 23, 24 to the end surfaces of the spoke covering layers 13, the leather wrapping operation of the leather covers 15L, 15R is completed.

Then, by mounting a lower cover (not shown in the drawing) and a pad P on the lower portion and the upper portion of the boss B, the manufacturing of the leather-wrapped steering wheel W is completed. The manufactured steering wheel W is mounted on a vehicle and can be used. At the time of mounting the steering wheel, the steering wheel W is fixedly secured to a steering shaft by means of a nut. Accordingly, in the state where the pad P is removed, the steering wheel W is mounted on the vehicle and, thereafter, the pad P is built in the steering wheel W.

According to the leather-wrapped steering wheel W of the embodiment having such a constitution, by merely pulling and tying the binding strings 26 in the fitting grooves 8, the distal edges 17, 18 of the leather cover 15 can be extremely easily fitted into the fitting grooves 8.

Further, by tying the binding strings 26, the distal edges 17, 18 of the leather cover 15, through which the binding strings 26 are made to pass, are assuredly disposed at the bottom surface 8a side of the fitting grooves 8. Accordingly, the distal edges 17, 18 of the leather cover 15 can be properly positioned and fitted into the fitting grooves 8.

Further, the distal edges 17, 18 of the leather cover 15 can be fitted into the fitting grooves 8 by simply tying the binding strings 26 without using adhesive agent or a spatula. Therefore, the distal edges 17, 18 of the leather cover 15 and the peripheries of the fitting grooves 8 are neither smeared nor injured.

Accordingly, with the leather-wrapped steering wheel W of this embodiment, the leather wrapping operation in the vicinity of the fitting grooves 8 can be carried out neatly and simply.

Figure 11A:
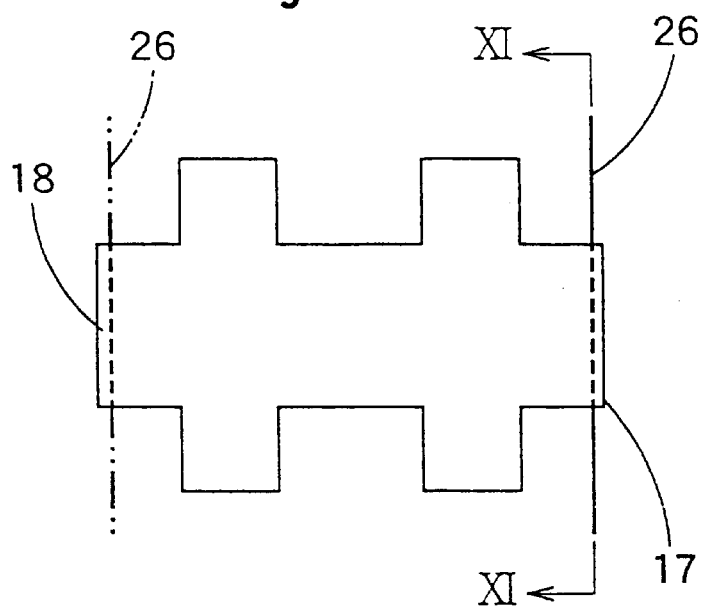
FIG. 11 is a schematic view showing the condition in which the binding string is made to pass through the distal edge of the leather in another embodiment.
Figure 11B:
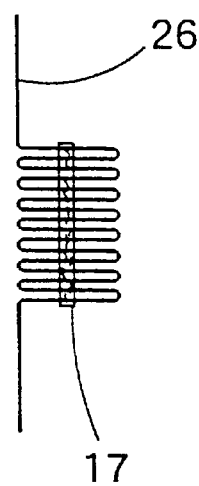

In this embodiment, the distal edges 17, 18 of the leather cover 15 are provided with loops 19 through which the binding strings 26 pass. Further, loops 19 are capable of restricting the movement of binding strings 26 along the surface circumferential direction of the ring R while permitting the movement of the binding strings 26 along the fitting grooves 8. As shown in FIG. 11, however, the distal edges 17, 18 of the leather cover 15 may be constituted without forming loops 19 such that the binding strings 26 are stitched to the distal edges 17, 18 of the leather cover 15 in the direction along the fitting grooves 8 which form annular grooves.

Figure 12:
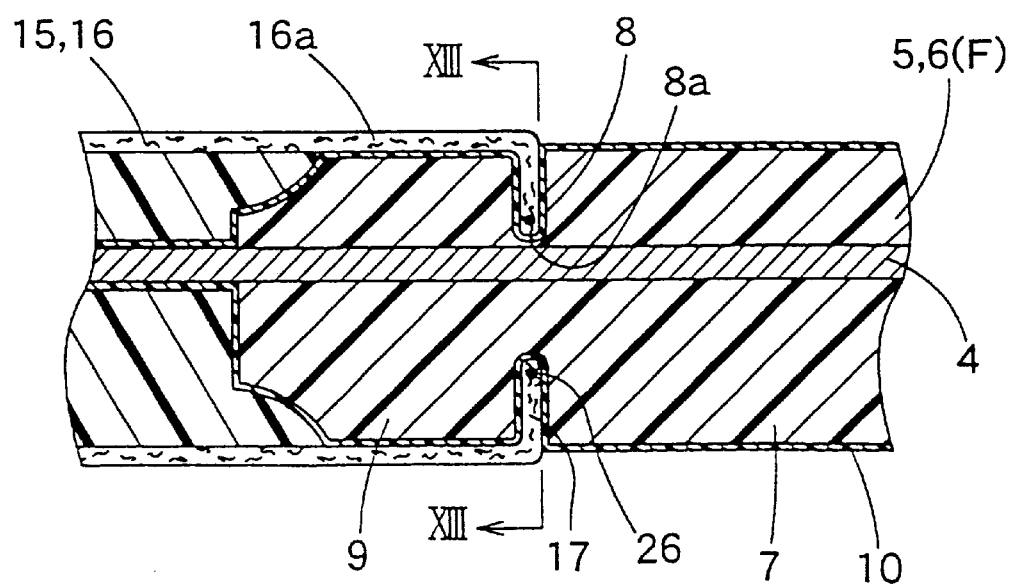
FIG. 12 is a cross-sectional view along the surface circumferential direction of a ring portion in the condition that distal edges of the leather of this embodiment are fitted into the annular grooves.
Figure 13:
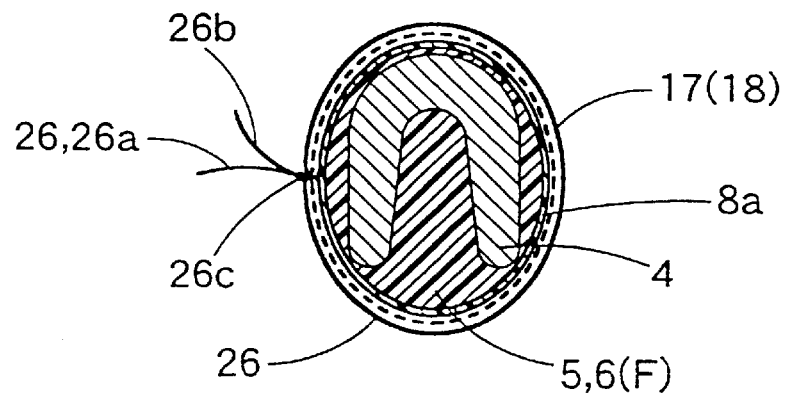
FIG. 13 is a cross-sectional view with a part omitted of FIG. 12 taken along a line XIII—XIII.

A manner of operation similar to the embodiment is carried out in this case as shown in FIG. 12 and FIG. 13. That is, first of all, the distal edges 17, 18 of the leather cover 15, through which the binding strings 26 pass, are disposed in the vicinity of the fitting grooves 8. Then, one end 26a of the binding strings 26 are wound once around the fitting grooves 8. Subsequently, both ends 26a, 26b are strongly pulled to tighten them. Further, as shown in FIG. 9C, by tying both ends 26a, 26b by a given tying method, such as a square knot, the leather wrapping operation in the vicinity of the fitting grooves 8 can be carried out neatly and simply.

Further, with the constitution where the binding strings 26 are stitched to the distal edges 17, 18 of the leather cover 15 in the direction along the fitting grooves 8, the processing man-hours and the processing cost of loops 19 can be reduced.

In case the binding strings 26 are stitched to the distal edges 17, 18 of the leather cover 15 without forming loops 19 as described above, as shown in FIG. 12, the depth of the annular grooves 8 is preferably set to a sufficiently large value, preferably, equal to or more than 5 mm. That is, the annular grooves 8 is deep enough to prevent the seam of the binding string 26 at the distal edges 17, 18 of the leather cover 15 from coming out from the portions of the annular grooves 8.

Further, in this embodiment, the upper and lower extension portions 21, 22, 23, 24 of the leather cover 15 extend over the front and rear surfaces ranging from the covering layer 12 of the ring R to the spoke covering layer 13 which is extended from the covering layer 12. Then, by stitching the edges 21a, 22a, 23a, 24a, 21b, 22b, 23b, 24b to each other, the upper and lower extension portions 21, 22, 23, 24 are disposed on the front and rear surfaces of the spoke covering layer 13. However, the edges 21a, 22a, 23a, 24a of the upper and lower extension portions 21, 22, 23, 24 are stitched to each other by making use of the remaining portion of the binding string 26 after tying the portion which is disposed in the fitting groove 8. Accordingly, it is unnecessary to cut off the distal edges of the binding string 26 and hence, the binding string 26 is fully utilized.

Further, in this embodiment, after fitting the distal edges 17, 18 of the body portion 16 of the leather cover 15 into the fitting grooves 8, the upper and lower extension portions 21, 22, 23, 24 are stitched to each other. That is, the distal edges 17, 18 of the body portion 16 of the leather cover 15 are properly positioned in place. As a result, the upper and lower extension portions 21, 22, 23, 24 are also properly positioned in place. Accordingly, the outer appearance of the leather-wrapped portions can be enhanced.

Further, in this embodiment, after tying the portion of the binding string 26 disposed in the fitting groove 8, one end 26a of the binding string 26 is used for the zigzag chain stitching (staggered stitching) of the peripheries of the upper and lower extension portions 21, 22, 23, 24 each other. The other end 26b is used to pass through the back side of the stitched portion 25. Then, at the portion where the zigzag chain stitching ends, one end 26a and the other end 26b of the binding string 26 are tied to each other. Accordingly, by tying the end portions 26a, 26b, the binding string 26 is caught in the leather 15. As a result, the slipping off of the binding strings 26 from the leather 15 can be prevented and the peeling off and the movement of the leather 15 can be suppressed.

Figure 14:
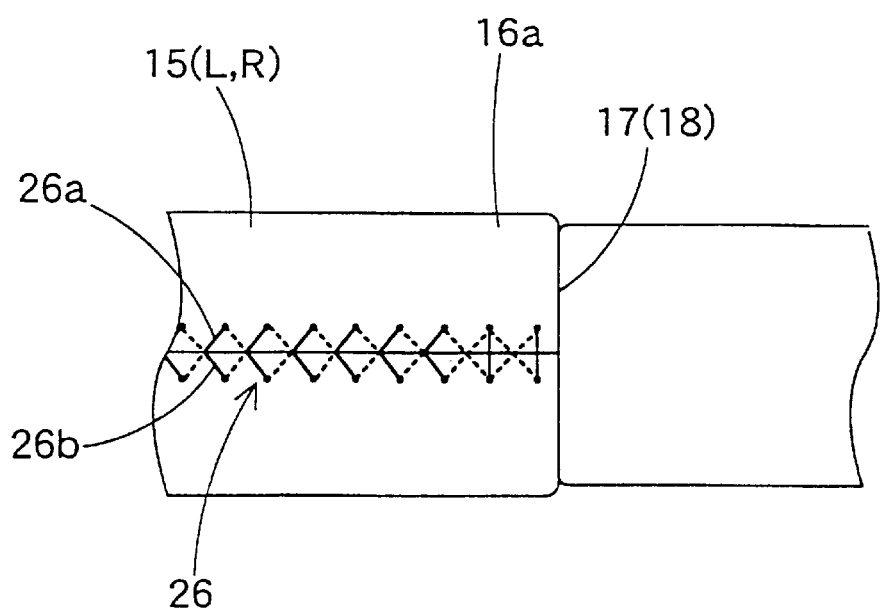
FIG. 14 is a view showing the stitching in still another embodiment.

In this embodiment, the stitching of the edges 16a of the body portion 16 to each other, the stitching of the edges 21a, 22a and 21b, 22b of the upper and lower extension portions 21, 22 to each other, the stitching of the edges 16b, 16c of the body portion 16 to each other, and the stitching of the edges 23a, 24a and the edges 23b, 24b of the upper and lower extension portions 23, 24 to each other are carried out in the zigzag chain stitching pattern (staggered stitching pattern) by using the binding strings 26, 27. However, as shown in FIG. 14, the stitched portion may be stitched in a two lock stitching where the end portions sides 26a, 26b of the binding string 26 are both stitched.

Further, in this embodiment, the leathers 15L, 15R are provided at two positions. However, one large leather may be provided or the leathers may be wrapped at more than three positions.

What is claimed is:

1. A leather-wrapped steering wheel provided with a ring portion which is gripped at the time of steering, wherein said ring portion includes a core, a covering layer which covers said core and leather which covers said covering layer, said covering layer includes annular grooves in the circumferential direction of the cross section of said ring portion, said leather is constituted such that binding strings are disposed at distal edges of said leather along the surface circumferential direction of said ring portion and said distal edges are fitted into said annular grooves so as to cover said covering layer, said binding strings are disposed at said distal edges of said leather, said binding strings are restricted from moving along the surface circumferential direction of said ring portion, and said binding strings are made to pass through the distal edges of said leather such that said binding strings are movable along said annular grooves, and said distal edges of said leather are disposed in said annular grooves together with said binding strings and are fitted into said annular grooves by pulling and tying both ends of said binding strings to each other.

2. A leather-wrapped steering wheel according to claim 1, wherein loop portions through which said binding strings are made to pass are formed on said distal edges of said leather.

3. A leather-wrapped steering wheel according to claim 1, wherein said binding strings are stitched to said distal edges of said leather in the direction along said annular groove.

4. A leather-wrapped steering wheel according to claim 1, wherein said leather includes upper and lower extension portions which are capable of covering front and rear surfaces ranging from the covering layer of said ring portion to the covering layer of spoke portions which are extended from the covering layer of said ring portion, and said upper and lower extension portions cover said covering layer of spoke portions by stitching the edges of said upper and lower extension portions using said binding strings after tying the leather at its positions in said annular grooves.

5. A leather-wrapped steering wheel according to claim 1, wherein portions of said covering layer around said annular grooves are made of hard covering layers, and portions of said covering layer which are covered by said leather away from said annular grooves are made of soft covering layers.

* * * * *